(12) United States Patent
Duis et al.

(10) Patent No.: US 8,582,945 B2
(45) Date of Patent: Nov. 12, 2013

(54) METHOD AND APPARATUS FOR ALIGNING OPTICAL TRANSPORTS IN A FERRULE

(75) Inventors: Jeroen Antonius Maria Duis, Didam (NL); Jan Willem Rietveld, Benschop (NL); Jacco Elenbaas, Heijningen (NL)

(73) Assignee: Tyco Electronics Nederland B.V., Ar's Hertogenbosch (NL)

( * ) Notice: Subject to any disclaimer, the term of this patent is extended or adjusted under 35 U.S.C. 154(b) by 402 days.

(21) Appl. No.: 12/836,928

(22) Filed: Jul. 15, 2010

(65) Prior Publication Data

US 2012/0014649 A1   Jan. 19, 2012

(51) Int. Cl.
  *G02B 6/00*   (2006.01)
  *G02B 6/36*   (2006.01)

(52) U.S. Cl.
  USPC ............. 385/137; 385/78; 385/83; 385/115

(58) Field of Classification Search
  USPC ............................................ 385/78, 83, 115
  See application file for complete search history.

(56) References Cited

U.S. PATENT DOCUMENTS

| | | | |
|---|---|---|---|
| 5,394,495 A | 2/1995 | Booth et al. | |
| 6,097,871 A | 8/2000 | De Dobbelaere et al. | |
| 6,424,785 B1 * | 7/2002 | Melchior | 385/139 |
| 6,519,393 B2 | 2/2003 | Booth et al. | |
| 6,631,228 B2 | 10/2003 | Gao et al. | |
| 6,817,777 B1 | 11/2004 | Grabbe et al. | |
| 7,369,728 B1 | 5/2008 | Hasegawa et al. | |
| 7,447,405 B1 | 11/2008 | Yamada et al. | |
| 2003/0174998 A1 | 9/2003 | Shevchuk et al. | |

OTHER PUBLICATIONS

"Polyguide(tm) Polymeric Technology for Optical Interconnect Circuits and Components", Booth et al., DuPont Company, date unknown.
Article obtained from www.thefreelibrary.com; "Siemens Fiber Optics and AMP Enter Multisource Agreement for Multi-Gigabit Parallel Optical Links", Business Wire, Feb. 23, 1998.

(Continued)

*Primary Examiner* — Eric Wong

(57) ABSTRACT

Methods and apparatus for aligning optical transports, such as waveguides and optical fibers, in a ferrule of an optical connector. The ferrule has an open side through which optical transports may be inserted into a transport cavity in the ferrule from a direction transverse the longitudinal direction of the optical transports and ferrule. To assemble the optical transports in the ferrule, the ferrule is positioned with its front face abutting and aligned with a jig that has an opening substantially identical to the ferrule cavity. The jig has grooves in a bottom surface of the cavity into which the optical transports will be inserted for transversely aligning the optical transports. The optical transports are then dropped into the aligned cavities of the ferrule and jig through the open sides of the ferrule and jig so that the front ends of the optical transports sit at least partially in the V-shaped grooves of the jig, thereby aligning the transports in the transverse dimension. A press cures adhesive in the cavity to cure the adhesive and fix the transports in the ferrule. The optical transports are then cleaved or otherwise cut flush with the front face of the ferrule. The process is repeated for each row of optical transports with the height of the bottom of the cavity in the jig adjusted for each subsequent row by an amount equal to the thickness of a row of the optical transports.

13 Claims, 14 Drawing Sheets

(56) References Cited

OTHER PUBLICATIONS

Article obtained from www.highbeam.com; "Infineon Technologies Licenses Parallel-Optical-Link—PAROLI—Modules to Molex, Crating Second Source for High-Performance Fiber Optic Data Link", Business Wire Press Release, Aug. 25, 2000.

"VCSELs for datacom applications", Wipiejewski et al., date unknown.

"PAROLI", obtained from hsi.web.com; date unknown.

Data Sheet; "Parallel Optical Link Transmitter: PAROLI(r) 2 Tx AC, 1.25 Gbit/s" and "Parallel Optical Link Receiver: PAROLI(r) 2 Rx AC, 1.25 Gbit/s"; Infineon Technologies, Nov. 19, 2003.

Color photographs of actual Infineon PAROLI device of Non-Patent Literature Item No. 6; date unknown.

International Search Report, International Application No. PCT/US2011/001188, International Filing Date Jul. 7, 2011.

* cited by examiner

METHOD AND APPARATUS FOR ALIGNING OPTICAL TRANSPORTS IN A FERRULE

FIELD OF TECHNOLOGY

The invention pertains to optical connectors. More particularly, the invention pertains to a method and apparatus for aligning optical waveguides and optical fibers in a ferrule during assembly of an optical connector.

BACKGROUND

It is typically the case that an optical signal transported over an optical fiber or waveguide (hereinafter collectively optical transport) must be coupled from that optical transport to another optical transport or to an optoelectronic device. Typically, the end of the optical transport is assembled to an optical connector of a given form factor, e.g., MT, which connector can be coupled to a mating optical connector on the other optical transport (or optoelectronic device).

Optical cables that are connected to each other through a pair of mating connectors may comprise a single optical transport. However, more and more commonly, optical cables contain a plurality of optical transports, and the light in each optical transport in the cable is coupled through a pair of mating connectors to a corresponding optical transport in another cable. Optical cables and connectors having more than 1000 transports or more are now available on the market.

In a typical optical fiber, for instance, the light is generally contained only within the core of the fiber, which typically may be about 10 microns in diameter for a single-mode fiber or about 50 microns in diameter for a multi-mode fiber. Waveguides are about equally as small in cross-section. Accordingly, lateral alignment of the transports in one connector with the transports in the other connector must be very precise. Hence, optical connectors generally must be fabricated extremely precisely to ensure that mating optical transports longitudinally align as well as possible so that as much light as possible is transmitted through the mating connectors to minimize signal loss during transmission.

Typically, an optical connector comprises a ferrule assembly that includes a separate cavity for each optical transport in the cable. Each optical transport is inserted into one of the cavities, which precisely aligns the transport laterally, i.e., horizontally and vertically (x and y planes) relative to some reference point on the ferrule assembly, such as an alignment pin or alignment hole that will mate with a corresponding alignment hole or pin on a mating connector. The optical transports will then be cut or polished flush with the front face of the ferrule assembly to align the ends of the transports in the longitudinal direction (z direction).

The ferrule assembly then is placed in a connector housing that typically includes a mechanism for guiding the ferrule into engagement with the ferrule of a mating connector as well as a mechanism for releasably locking the two connectors together.

Such ferrules are commonly manufactured by injection molding and are relatively expensive and complex to manufacture because they have complex shapes and require significant polishing of many surfaces in order to achieve the desired tolerances. Typical tolerances for optical transport alignments are about 1-2 microns.

SUMMARY

The invention pertains to methods and apparatus for aligning optical transports, such as waveguides and optical fibers, in a ferrule of an optical connector. Particularly, the ferrule has an open side through which optical transports may be inserted into a transport cavity in the ferrule from a direction transverse the longitudinal direction of the optical transports and ferrule. To assemble the fibers in the ferrule, the ferrule is positioned with its front face abutting a jig that has an opening substantially identical to the ferrule cavity (with an open side) and transversely and longitudinally aligned with the ferrule opening. A curable adhesive is placed in the cavity of the ferrule. The jig has grooves in a bottom surface of the cavity into which grooves the optical transports will be inserted for transversely aligning the fibers. The fibers are then dropped into the aligned cavities of the ferrule and jig through the open sides of the ferrule and jig so that the front ends of the optical transports sit at least partially in the V-shaped grooves of the jig, thereby aligning the transports to the V-shaped grooves in both dimensions transverse to the longitudinal dimensions of the transports (i.e., height-wise and horizontally). The adhesive is then cured, such as by use of a hot press inserted through the open side of the ferrule, thereby fixing the optical transports to the ferrule. The ferrule may then be removed from the jig and the optical transports cleaved or otherwise cut flush with the front face of the ferrule.

The transports in an optical connector are often arranged in multiple rows of a plurality of transports (e.g., six rows, each row containing 12 transports). Thus, an entire row of transports may be inserted, aligned, cured in place, and cut simultaneously as a unit. After the first row of optical transports, each row can be inserted, aligned, cured in place, and cut in the same manner. The height of the bottom of the cavity in the jig is adjusted for each subsequent row by an amount equal to the thickness of a row of the optical transports. This may be accomplished, for instance, by providing a different jig for each row, where the bottom of the cavity of each subsequent jig is higher than the bottom of the preceding jig relative to mechanism that aligns the ferrule to the jigs.

If desired, after all of the optical transports have been placed, a cap can be placed in the open side of the ferrule and adhered to close off the ferrule cavity.

DETAILED DESCRIPTION OF EMBODIMENTS

Figure 1A:
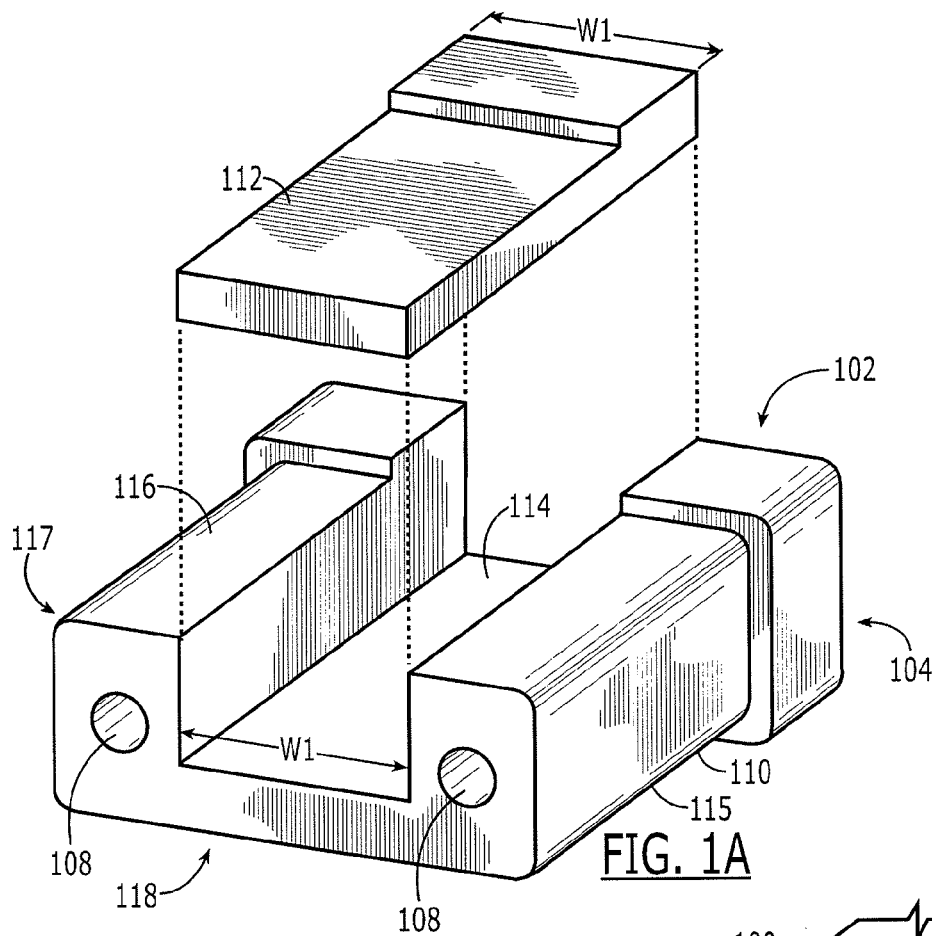
FIG. 1A is a perspective view of a ferrule in accordance with a first embodiment of the invention.
Figure 1B:
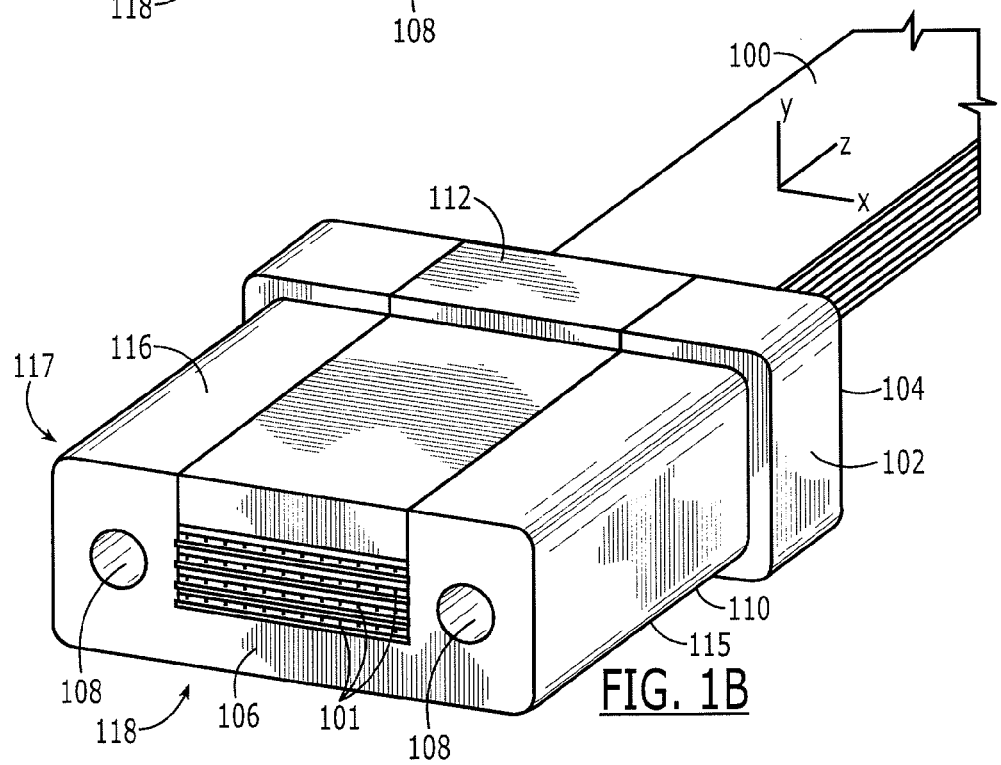
FIG. 1B is a perspective view of the ferrule of FIG. 1A assembled with to the end of an optical cable having multiple optical transports.

FIG. 1A is a blow-up perspective view of a ferrule 102 in accordance with one embodiment of the present invention. FIG. 1B is a perspective view of an optical transport cable 100 terminated within the ferrule 102 in accordance with the first embodiment of the invention. The exemplary cable comprises 48 optical transports 101 arranged as four stacked waveguide layers 103, each comprising 12 optical transports 101. The ferrule may further be encased within a connector housing adapted to mate with a corresponding connector to provide a complete optical cable assembly. However, in order not to obfuscate the invention, only the ferrule and the cable are shown in all the drawings and no connector housing is shown, it being understood that the assembled ferrule/cable combination would generally further be assembled to a connector housing to complete a cable assembly. The ferrule comprises a main body 110. As is common, the ferrule body 110 comprises a front face 106 at which face the optical transports 101 in the cable are terminated for mating with a next cable assembly or an optoelectronic device and a rear face 104 through which the cable 100 enters the ferrule. This exemplary ferrule main body 110 is generally rectilinear, and therefore has four lateral faces running longitudinally between the front and rear faces 104, 106, namely a right side face 115, a top face 116, a left side face 117, and a bottom face 118. Cylindrical and other-shaped ferrules are also well known. Further, as is typical, the front face 106 of the ferrule 102 includes one or more alignment mechanisms for aligning the ferrule (and, thus, the optical transports within it) with the ferrule of a mating connector. In this case, the alignment mechanisms are alignment holes 108 for accepting mating alignment pins on a mating ferrule. Main body 110 defines a longitudinal cavity 114 running fully between the rear face 106 and the front face 108 for receiving the optical transports therethrough. Cavity 114 is generally rectilinear in this embodiment. The illustrated cavity is uniform throughout its length, but this is merely exemplary. The cavity, for instance, may have an enlarged portion at the rear of the cavity to allow for a greater thickness of adhesive for purposes of providing additional strain relief for the cable at the rear of the ferrule. Unlike most conventional ferrules, the cavity 114 for accepting optical transports also is open to a lateral side of the ferrule body 110, namely, top face 116.

In the prior art, the cavity for the optical transports typically is a throughbore with no opening to a lateral side of the ferrule body, except possibly a small opening for permitting adhesive to be injected into the ferrule for bonding the fibers in the ferrule cavity. Therefore, the optical transports must be inserted into the ferrule in the longitudinal direction (the z direction in FIGS. 1A and 1B). In the present invention, on the other hand, optical transports may be inserted into the cavity 114 in a lateral direction or a longitudinal direction.

A cover piece 112 to close off the lateral opening after the ferrule and cable have been assembled together is optional.

Generally, the optical transports must be assembled in the ferrule with their lateral orientations extremely precisely aligned relative to the alignment mechanism (e.g., the alignment holes 108) of the ferrule so that they will align very precisely with mating optical transports in a mating connector.

Figure 2:
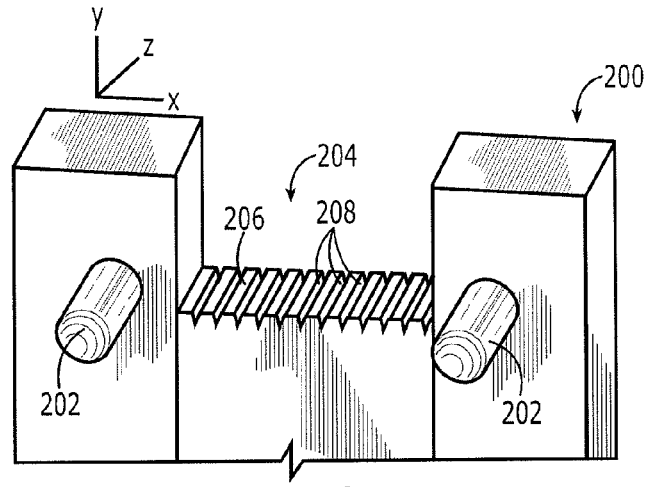
FIG. 2 is a perspective view of a first jig for assembling optical transports to a ferrule in accordance with the first embodiment of the invention.

FIG. 2 is a perspective view of a jig 200 designed to be used with a ferrule such as ferrule 102 to align the optical transports in the cavity of the ferrule very precisely relative to the alignment holes 108. The jig 200 includes alignment mechanisms for mating with the alignment mechanisms 108 on the ferrule. In this case, the alignment mechanisms are alignment pins 202 for mating with the alignment holes 108 in the ferrule. Of course, the pins and holes could be reverse between the jigs and the ferrules. The jig 200 includes a window 204 substantially similar in a cross section (x-y plane) to the cavity 114 of the ferrule 102. Typically, it is a window in the z direction and is open laterally at its top. The bottom surface 206 of the window 204 is serrated with a plurality of grooves 208. In one preferred embodiment, as illustrated, the grooves are generally V-shaped grooves 208. The grooves 208 are aligned very precisely in the horizontal, x direction relative to the alignment pins 202 to correspond to the desired horizontal alignment of the optical transports in the ferrule. The height of bottom wall 206 also is set very precisely relative to the height of the alignment pins 202 to correspond to the desired height of the optical transports in the ferrule 102.

As will be described in more detail in connection with FIGS. 4A-4O, the mounting holes 108 on the ferrule 102 will be mounted on the mounting pins 202 of the jig 200 to align the window 204 on the jig 200 with the cavity 114 of the ferrule 102 essentially in the same manner that the cavities of two mating ferrules would align with each other when two mating connectors are brought together. Then, the optical transports 101 will be laid in the now-aligned ferrule cavity 114 and jig window 204 with each optical transport in a corresponding V-groove 208 in order to precisely laterally (in the x-y plane) align the optical transports at the front face 106 of the ferrule 102. The optical transports 101 will be adhered in this position and then the ferrule 102 can be removed from the jig 200 and any portions of the optical transports 101 protruding beyond the front face 106 of the ferrule 102 can be removed, such as by laser cleaving, cutting, and/or abrasive polishing.

Since the jig 202 is completely uniform in the longitudinal direction (z), it can be manufactured using two dimensional wire EDM (Electron Discharge Machining), and thus can thus be manufactured very precisely yet inexpensively. Wire EDM can provide tolerances of less than 1 micron. Furthermore, the jig can be made in one quick wire EDM manufacturing process.

With respect to optical fibers, as is typical in optical connectors, the front ends of the fibers in the ferrule are stripped of their insulation, leaving only the core and cladding, which is generally cylindrical. Accordingly, when the cylindrical cores are laid into the grooves, they will sit in the grooves in a very precise position relative to the groove with the cylindrical profile making contact with the walls of the v-groove at two points.

Figure 3:
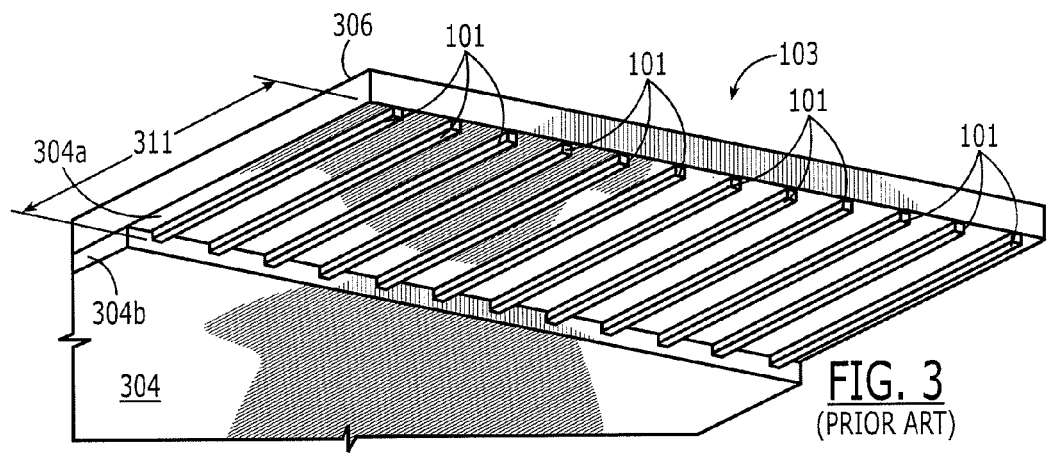
FIG. 3 is a perspective view of a row of waveguides prepared for alignment in accordance with the principles of the first embodiment of the invention.

Optical waveguides, on the other hand, are processed differently for assembly in the cavity 114 of the exemplary ferrule 102 of the invention. FIG. 3 is a perspective view of a layer of optical waveguides such as one of the layers 101 shown in FIG. 1B. It comprises twelve parallel optical wave guides 101 embedded in planar cladding 304 supported on a polymer mechanical support layer 306. Waveguides typically are manufactured in a planar manner using epitaxial layer processes commonly associated with printed circuit board manufacturing. For instance, a first layer 304a of cladding is deposited on top of a substrate of the mechanical support structure 306. (Please note that the waveguide layer 103 is shown upside down in FIG. 3 as compared its orientation during fabrication as described herein). Then, using conventional photolithography techniques, a plurality of strips of waveguide core material is deposited on top of the first cladding layer 304a to form the waveguides 101. For example, a layer of photoresist is deposited over the first cladding layer 304a, the photoresist is developed through a photolithography mask corresponding to the desired pattern of the waveguides 101, the core material, typically initially a liquid, is deposited over the developed photoresist and cured, the remaining photoresist is washed away (taking away any of the core material deposited on it, thus leaving the waveguide cores 101 on the first cladding layer 304a. Then, a second layer of cladding 304b is deposited over the first cladding layer 304a and waveguides 101.

Accordingly, in order to allow the waveguide cores 101 to be laterally aligned by placement within the V-grooves 208 of the jig 200, the waveguides are fabricated so that the second layer of cladding 304b does not cover the front ends of the wave guide (e.g., the first 2 mm of the waveguide), as illustrated in FIG. 3. For instance, the waveguide layers 103 may be manufactured using a photolithography mask for the second cladding layer 304b that causes the top layer 304b to end 2 mm short of the end of the first cladding layer 304a and the cores 101. Then, the remainder of the waveguide 300 that still includes the full cladding 304 can be placed in the cavity 114 of the ferrule 102 while the semi-exposed front ends of the cores (see reference numeral 311 in FIG. 3) extend into the window 204 of the jig with the cores 101 sitting in the v-grooves 208 of the jig 200.

The cores 101 in a layer 103 of optical waveguide are rectilinear rather than cylindrical, as they are for optical fibers. Nevertheless, the illustrated V-shaped grooves 208 actually work well for both cylindrical optical fibers and rectilinear optical waveguide cores. Specifically, the waveguide cores 101 will not rotate about their longitudinal axes because they are attached to the first cladding layer 304a. Hence, just like the cylindrical fiber cores, the waveguide cores 101 will make contact with the V-grooves 208 at two points to properly position the transport both horizontally and vertically (x and y directions). Accordingly, while the grooves 208 may be cylindrical for applications in connection with optical fibers or rectilinear in connection with applications with optical wave guides, V-shaped grooves are acceptable for both applications.

Optionally, V-grooves can also be placed in the bottom surface of the cavity 114 in the ferrule 102 to provide extra alignment precision with respect to at least the bottom-most row of optical transports.

FIGS. 4A through 4M illustrate one exemplary process for assembling a plurality of optical transports to a ferrule in accordance with the present invention. In this example, the cable comprises forty-eight cores comprised of four rows of twelve cores each.

Figure 4A:
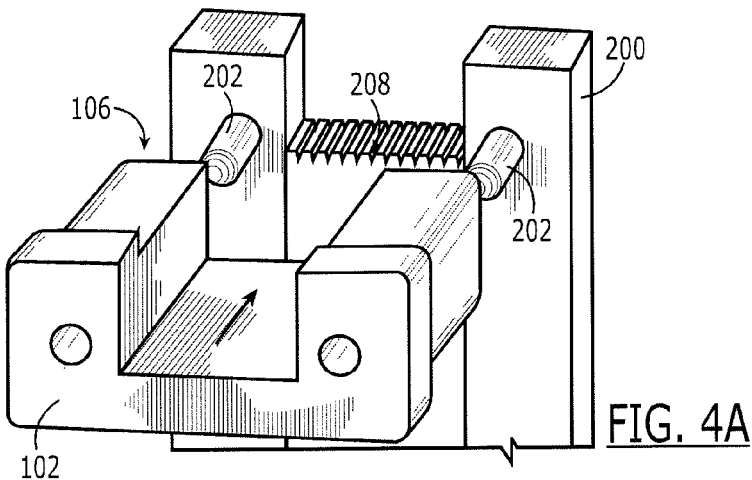
FIGS. 4A through 4O illustrate various stages in one process for assembling a ferrule with multiple optical transports in accordance with one embodiment of the invention.

Turning to FIG. 4A, the ferrule 102 is mounted on the alignment pins 208 of the jig 200 so that the front face 106 of the ferrule 102 abuts the surface 222 of the jig.

Figure 4B:
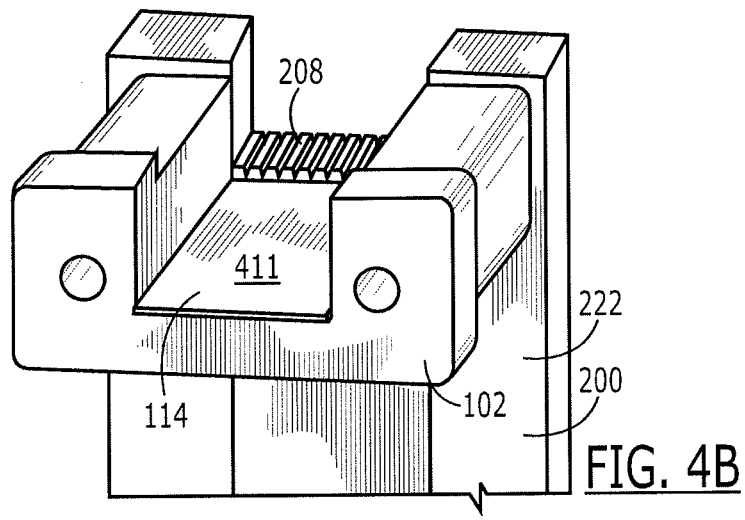
Figure 4C:
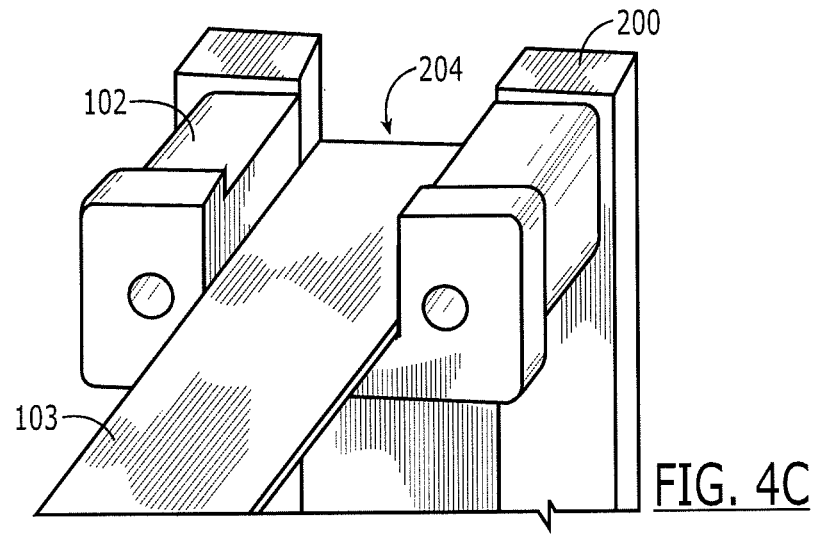
Figure 4D:
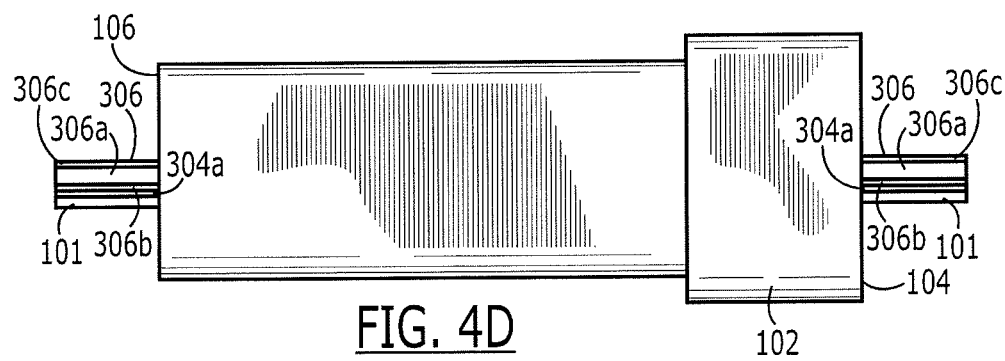

Next, as shown in FIG. 4B, a layer of adhesive 411 is deposited on the bottom surface of the ferrule window 114. Next, referring to FIG. 4C, a first optical wave guide layer 103, comprising a row of twelve cores, is placed on the adhesive 411 in the ferrule 102 with the front portion (e.g., portion 311 in FIG. 3) extending into the window 204 of the jig 200. Particularly, the front end of the wave guide is positioned so that it extends at least partially into the window 204 of the jig 200 so that the fully clad portions of the waveguide cores extend completely through the ferrule. The proper position is shown in FIG. 4D, which is a side view of the ferrule 102 and first layer of waveguides 103. As can be seen, the support substrate 306, first cladding layer 304a, and cores 101 extend past the front face 106 of the ferrule 102, while the second cladding layer 304b ends essentially at the front face 106 of the ferrule 102. In some embodiments, the jig may include one or more protrusion that prevents the front face 106 of the ferrule 102 from being inserted onto the jig 200 with the front face flush with the surface 222 of the jig 102, but instead leaving a small gap so that any tiny segment of the second cladding layer 304b sticking out past the front face 106 of the ferrule will not contact the jig and potentially interfere with the proper height alignment of the cores 101 in the V-grooves 208. However, if the distance that the second cladding layer extends beyond the front surface of the ferrule is fairly small, it is unlikely to have a significant effect on the proper height alignment of the cores.

Figure 4E:
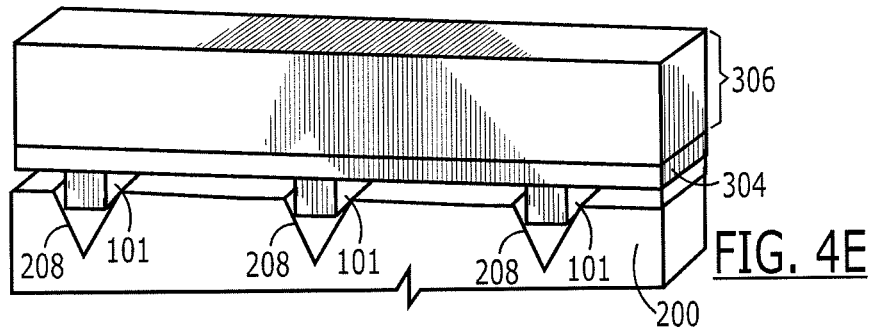

Referring to FIG. 4E, which is a close up view of the cores 101 fitting in the V-grooves 208 of the jig 200, it is seen that the cores make contact with the V-grooves at their two lower corners, thus aligning the cores horizontally (x dimension). The height of the cores 101 is substantially determined by the height of the tops of the grooves. More specifically, the portions of the cladding layer 304a between the cores rest on the tops of the grooves with the cores extending down into the grooves.

Figure 4F:
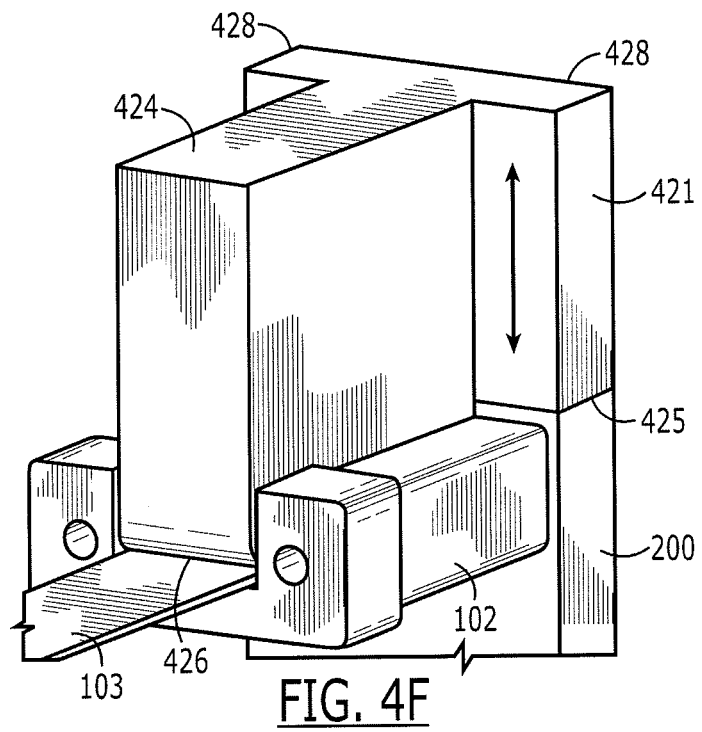

Referring next to FIG. 4F, a hot pressure/curing die tool is used to deploy a die 421 to press down on the layer 103 of wave guide cores 101 and heat up to cure the adhesive 411. Preferably, the press face 426 of the die 421 is sized and shaped to essentially fill the entire cavity 114 in the ferrule 102 so as to maintain constant pressure on the waveguide layer 103 over its entire extent in the ferrule and to evenly cure the adhesive 421. The pressure applied by the hot pressured/curing die 421 may be selected to push down on the wave guide layer 103 with a predetermined force so as to even more precisely control the vertical position/alignment of the wave guides (y dimension). Particularly, the cores and cladding of a typical optical waveguide actually are somewhat resilient, having a Shore durometer value typically of about D 70 and D 50, respectively. Thus, a predetermined amount of pressure can be chosen so as to press the cores and cladding down into the V-grooves a desired amount to precisely align them vertically before they are cured in place. Alternately or additionally, the die includes a stop face 425 that is positioned to contact the top of the jig 200 and is disposed at a height relative to the main portion 424 of the die (the portion that goes into the ferrule cavity 114 and touches the waveguide layer 103) to cause the press face 426 of the main portion 424 to stop at a specifically defined height above the bottom of the window 204 of the jig 200, as will be discussed in more detail below in connection with FIGS. 5A-5D.

As an alternate to temperature curing, the adhesive may be cured by ultraviolet or light curing. Such alternate curing techniques have the advantage of not requiring exposing the ferrule to high temperatures, which can create manufacturing difficulties when the various materials being heated have different coefficients of thermal expansion.

Figure 4G:
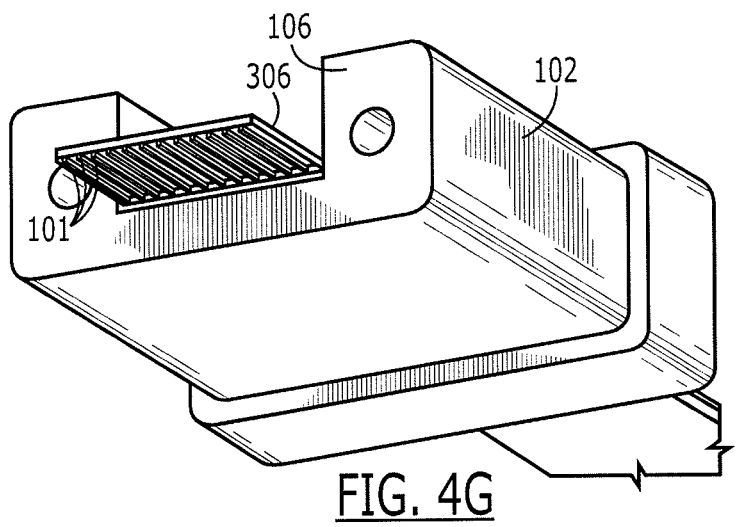

FIG. 4G is a perspective view showing the ferrule 102 and waveguide layer 103 at this point in this process. As can be seen, the cores 101, substrate 306, and first cladding layer 304a are extending past the front face 106 of the ferrule 102.

Figure 4H:
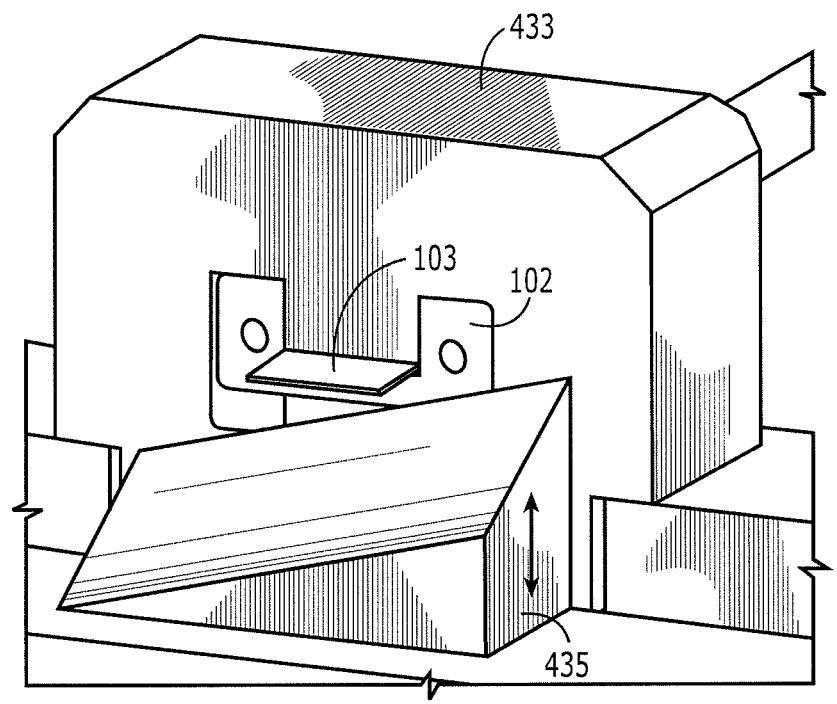
Figure 4I:
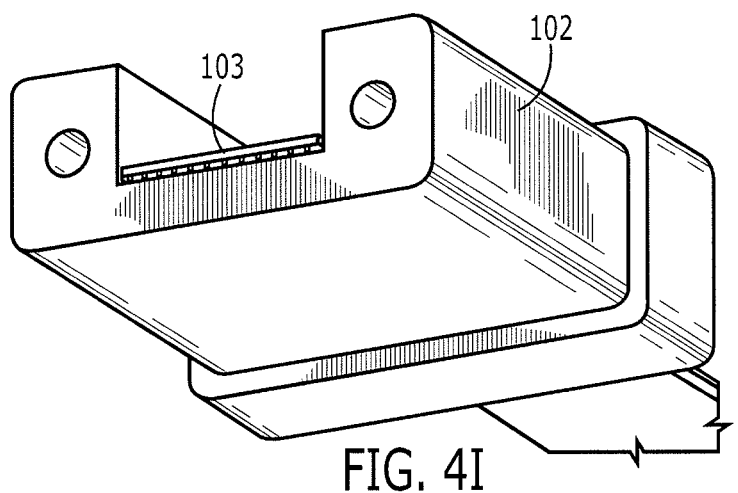
Figure 4J:
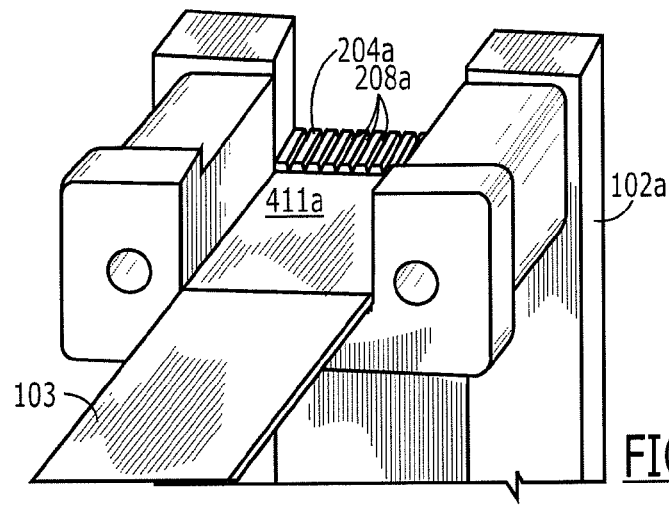

Next, referring to FIG. 4H, the ferrule 102 is placed in a cutting die 433 and a cutting knife 435 cuts the end of the wave guide layer 103 flush with the front face 106 of the ferrule 102. Alternately, the front of the waveguide layer 103 can be removed by laser cleaving. FIG. 4I shows the ferrule 102 and waveguide layer 103 after cutting.

At this point, the first waveguide layer 103 is completely assembled to the ferrule 102.

Figure 4K:
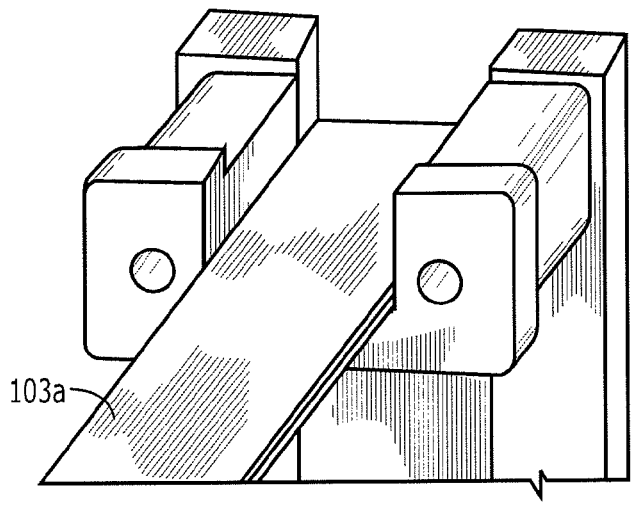
Figure 4L:
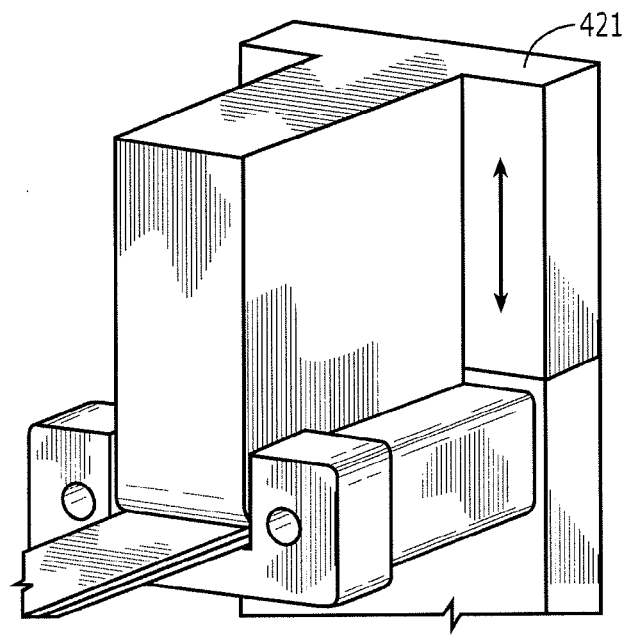

Essentially, the same process described herein above may be repeated for each additional waveguide layer 103. Particularly, with reference to FIG. 4J, the ferrule 102 is next mounted to a different jig 102a. This jig 102a is essentially identical to the first jig 102 except that the bottom wall 204a containing the v-grooves 208a is positioned higher relative to the alignment pins (not shown) by an amount equal to the thickness of one wave guide layer 103 plus one adhesive layer 411. Then, another layer of adhesive 411a is put down on top of the first wave guide layer 103. Referring to FIG. 4K, the next layer of wave guide 103a is placed on top of the adhesive layer 411a. Then, as shown in FIG. 4L, the hot pressed/curing die 421 comes down to apply downward pressure on the waveguide layer 103a and heat the adhesive 411a to cure it.

Note that, the adhesive layer may be used to compensate for variations in the heights of the waveguide layers to even further help assure proper vertical alignment of the waveguides. For instance, if the height of the first waveguide layer is less than expected, such that the second waveguide layer would otherwise sit too low in the ferrule, the height of the second waveguide layer may be raised to the proper level by simply making the adhesive layer thicker. In fact, in one embodiment, space for extra adhesive to squirt out from between the waveguide layers is built into the ferrule so that thicker layers of adhesive may be placed between the waveguide layers than might be necessary. Then, when the hot pressure die presses the waveguide layer down, any excess adhesive that would otherwise prevent the overlying waveguide layer from being pressed down to the proper height can squirt out into the additional space. Such additional space may be provided simply by making the width of the cavity 114, e.g., width W1 in FIG. 1A, wider than the width of the waveguide layers.

Figure 4M:
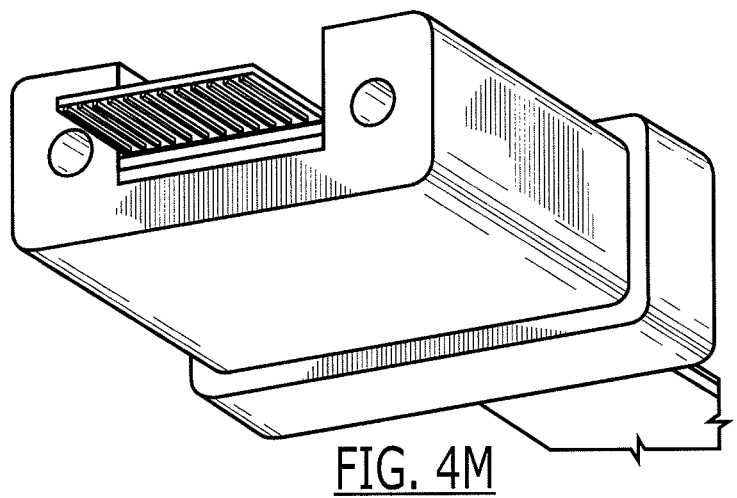
Figure 4N:
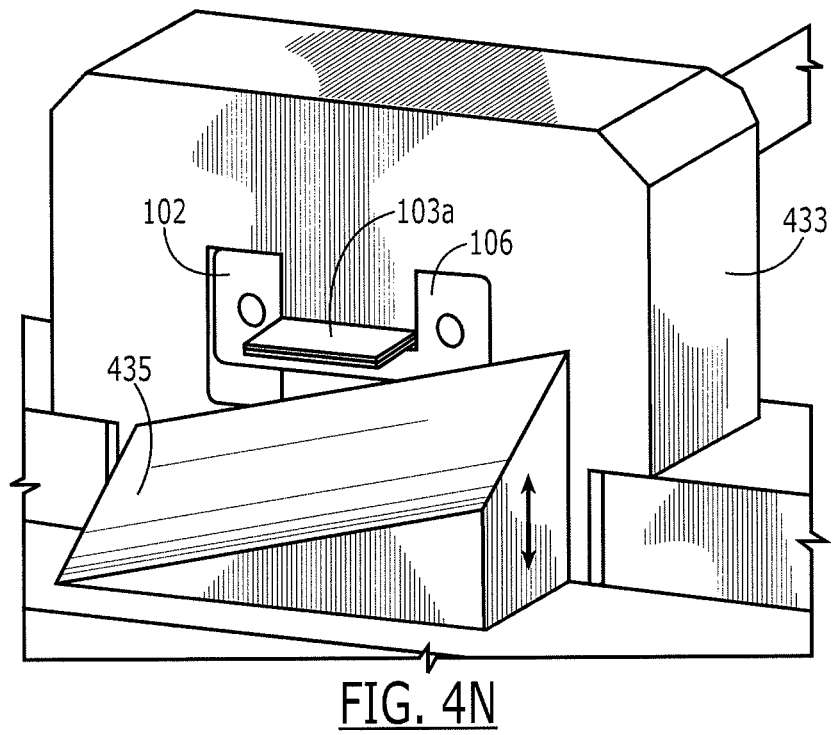
Figure 4O:
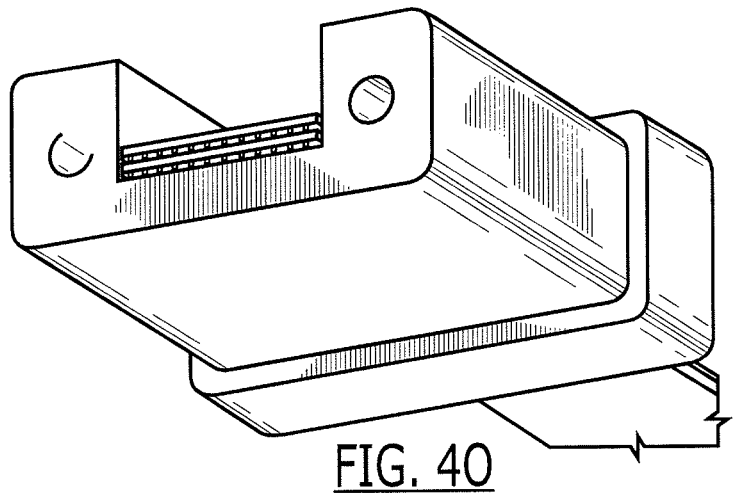

FIG. 4M is a perspective view of the ferrule 102 at this point of the process. Next, as shown in FIG. 4N, the ferrule 102 is again placed in the cutting die 433 and the cutting knife 435 is used to cut the second waveguide layer 103a flush with the front face 106 of the ferrule 102. FIG. 4O shows the ferrule at this point of the process.

The same steps can be repeated for as many waveguide layers as the ferrule will contain.

Next, a cover such as cover 112 shown in FIGS. 1A and 1B, may be placed in the remaining space of the cavity 114 of the ferrule 102 to close off the cavity and finish the top of the ferrule completely flush. The cover may be adhered to the opening. More particularly, a layer of adhesive may be placed on top of the top-most layer of optical transports and the cover 112 placed on top thereof in contact with the adhesive layer. The adhesive may then be cured to affix the cover in place, such as by heating the entire assembly or by use of the aforementioned hot pressure/curing die 421 on top of the cover 112.

The cover 112 is not necessary for purposes of trapping the waveguides in the cavity insofar as the waveguides are already adhered fixedly in the ferrule and therefore, may be omitted. However, it provides additional structural stability to the ferrule. It further causes the ferrule to look more like a traditional ferrule. Even further, it helps divide forces evenly over two mating ferrules. Particularly, if the ferrules in accordance with the present invention are used for hermaphroditic connector mating, then, when two connectors are mated, the ferrule in one of the connectors will be facing up (e.g., with the cover up) and the ferrule in the other connector will be facing down (e.g., with the cover facing down). Thus, without the covers, the forces in the coupled ferrules may not be evenly distributed because of the asymmetric nature of the mating ferrules without covers. The covers help make the ferrules more symmetric, at least structurally and in terms of force distribution.

FIGS. 5A through 5D are front plan view of four jigs 500a, 500b, 500c, 500d to be used in accordance with the one embodiment of the present invention adapted for assembling a connector for forty-eight wave guides comprising four waveguide layers (or rows) of twelve each. In this particular embodiment, the four jigs 500a, 500b, 500c, 50d0 are identical to each other except for the height of the bottom wall 506a-506d of the window 504a-504d relative to the alignment pins 518a-518d. In this particular example, the combined height of each layer of adhesive and wave guide is 0.25 millimeters. Accordingly, in the first guide 501a illustrated in FIG. 5A, the top of the V-grooves 508a are positioned 0.350 millimeters below the longitudinal centers of the alignment pins. In this embodiment, a different hot pressure/curing die 521a, 521b, 521c, 521d is used with each of these four jigs 500a-500d. Each die 521a-521d is designed with a main portion 524a-524d bearing the press face 526a, 526b, 526c, 526d that enters the cavity of the ferrule (not shown) and presses down on the optical transports. Each die 521a-521d further includes two wings 528a, 528b, 528c, 528d with stop faces 525a, 525b, 525c, 525d designed to abut the top face 551a-551d of the respective jig 500a-500d when the press face 526a-526d of the respective die is a predetermined distance above the bottom surface of the ferrule cavity. Since the cores are approximately 0.25 mm in diameter, the cores are inserted approximately 0.111 mm within the V-grooves 208a-208d.

In the second jig 500b, the tops of the v-grooves 508b in the bottom wall 506b of the window 504b are positioned 0.25 millimeters higher relative to the alignment pins 518b than were the tops of the V-grooves 508a in the first jig 500a. Particularly, it is positioned 0.100 millimeters below the longitudinal central axis of the alignment pins 518b. Likewise, the top surface 551b of the jig extends 0.25 mm farther above the longitudinal central axis of the alignment pins 518b than does the top surface 551a of the first jig 500a.

Particularly, the top surface 551a-551d of each jig 500a-500d is designed so that there is a predetermined vertical gap between the bottom of the main part 524a-524d of the die 521a-521d and the tops of the v-grooves 508a-508d when the stop faces 525a-525b meet the top surfaces 551a-551d of the various dies 500a-500d.

Figure 5A:
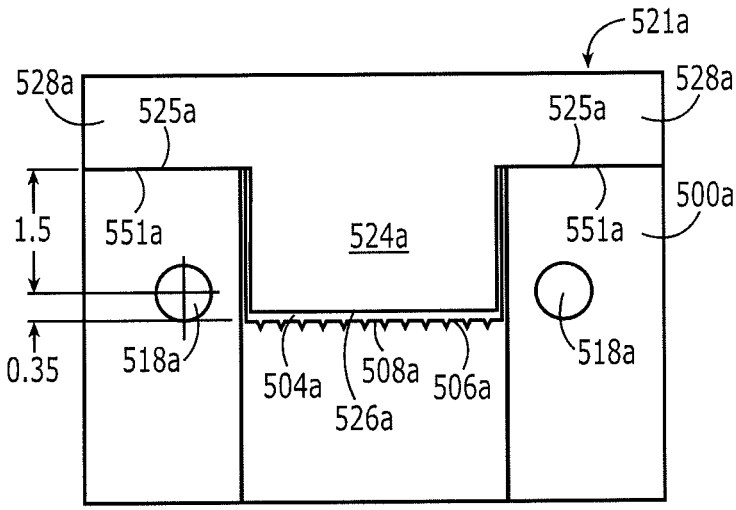
FIGS. 5A through 5D are front plan views of a set of four jigs for assembling optical transports to a ferrule in accordance with one embodiment of the invention.
Figure 5B:
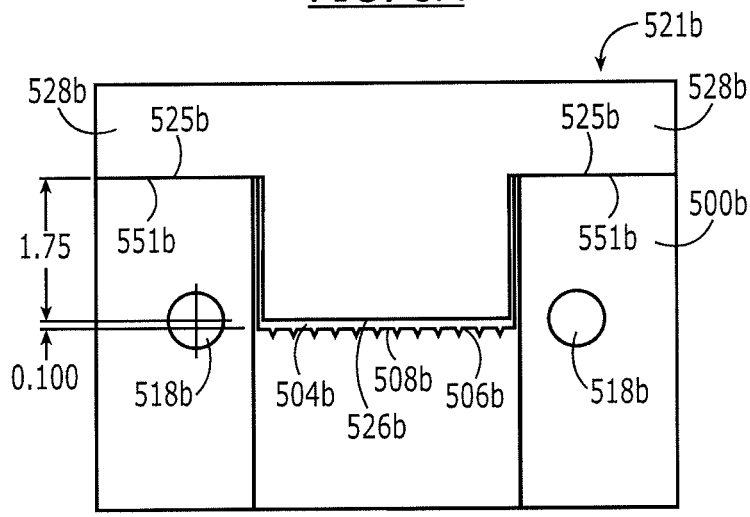
Figure 5C:
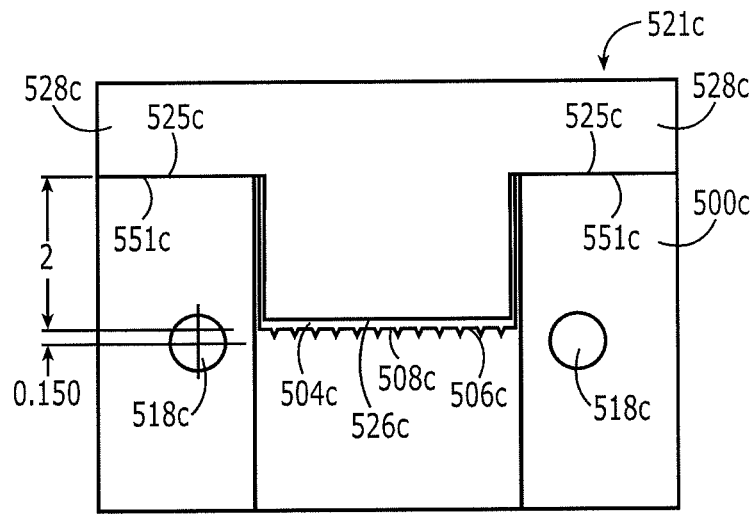
Figure 5D:
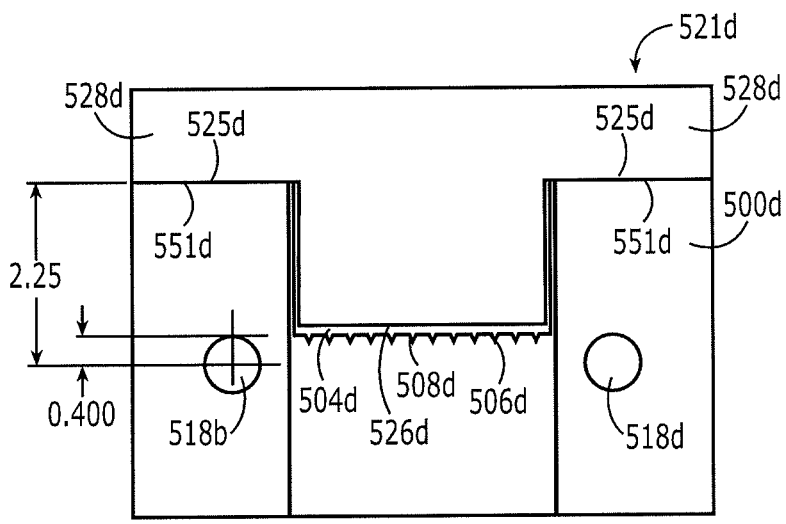

FIGS. 5C and 5D illustrate the dimensions set in accordance with the scheme described above for the third and fourth jigs. For example, in the third jig 500c, the tops of the V-grooves 508c are at a height of 0.150 millimeters above the central longitudinal axes of the alignment pins 508c and the top surface 551c is 2.00 mm above the central longitudinal axes of the alignment pins 508c. In the fourth jig 500d, the tops of the V-grooves 208d are 0.400 millimeters above the central longitudinal axes of the alignment pins 508d and the top surface 551d is 2.25 mm above the central longitudinal axes of the alignment pins 508d.

Figure 6:
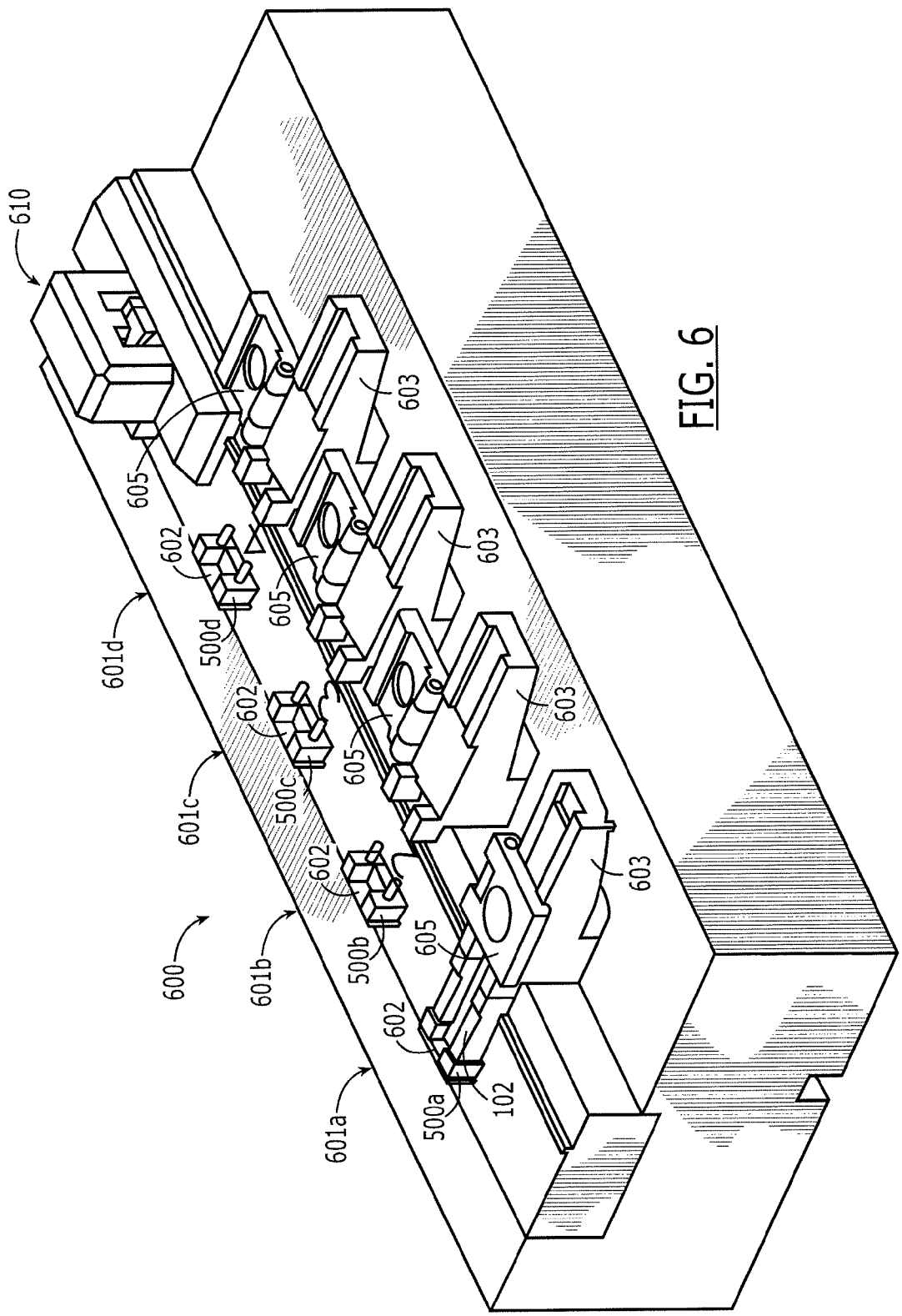
FIG. 6 is a perspective view of a mounting tool station for semi-automatically assembling a ferrule with multiple optical transports in accordance with one embodiment of the invention.

FIG. 6 is a perspective view of one possible mounting tool 600 for assembling cable/ferrule assemblies substantially manually in accordance with the principles of the invention. As can be seen, the mounting tool 600 has four stations 601a, 601b, 601c, 601d, one corresponding to each of four jigs (staying with the example of four layers of optical transports in the ferrule). Each station 600a-600d comprises a different jig (e.g., jigs 500a-500d, respectively), a z-stop 602 against which the respective jig will rest to set the jig in the z direction, a ferrule clamp 603, and a wave guide clamp 605. The z-stops 602, ferrule clamps 603, and wave guide clamps 605 may all be identical to each other. FIG. 6 shows the first station 601a in use with a ferrule 102 clamped therein. Particularly, the ferrule clamps 603 are slideably mounted on rails (not seen in FIG. 6) so as to allow the ferrule 102 to be mounted on the alignment pins of the corresponding jig 500a. Once the ferrule is in place, the ferrule clamp is slid forward and locked to hold the ferrule 102 tight on the jig 500a and push the ferrule 102 and jig 500a against the z-stop 602.

Then, the first layers of adhesive and waveguides are placed in the ferrule and jig, and the fiber clamp 605 is rotated about its hinge and locked in the closed position to apply downward pressure on the waveguide layer just behind the ferrule. The waveguide clamp 605, for instance, may have a latch mechanism for holding the waveguide clamp in the closed position illustrated in FIG. 6 for station 601a to maintain a constant downward pressure on the wave guide. (The other waveguide clamps 602 of stations 601b-601d are shown in the open position). The mounting tool 600 would then be placed in a hot pressured/curing die tool with station 601A under the die for curing the adhesive as previously described in connection with FIGS. 4A-4O.

The mounting tool 600 further includes a cutting station 610. In one embodiment, after each layer of wave guides is cured, the ferrule 102 can be removed from the station 601a-601d and brought over to the cutting station 610 for cutting the transports flush with the front face of the ferrule.

Figure 7A:
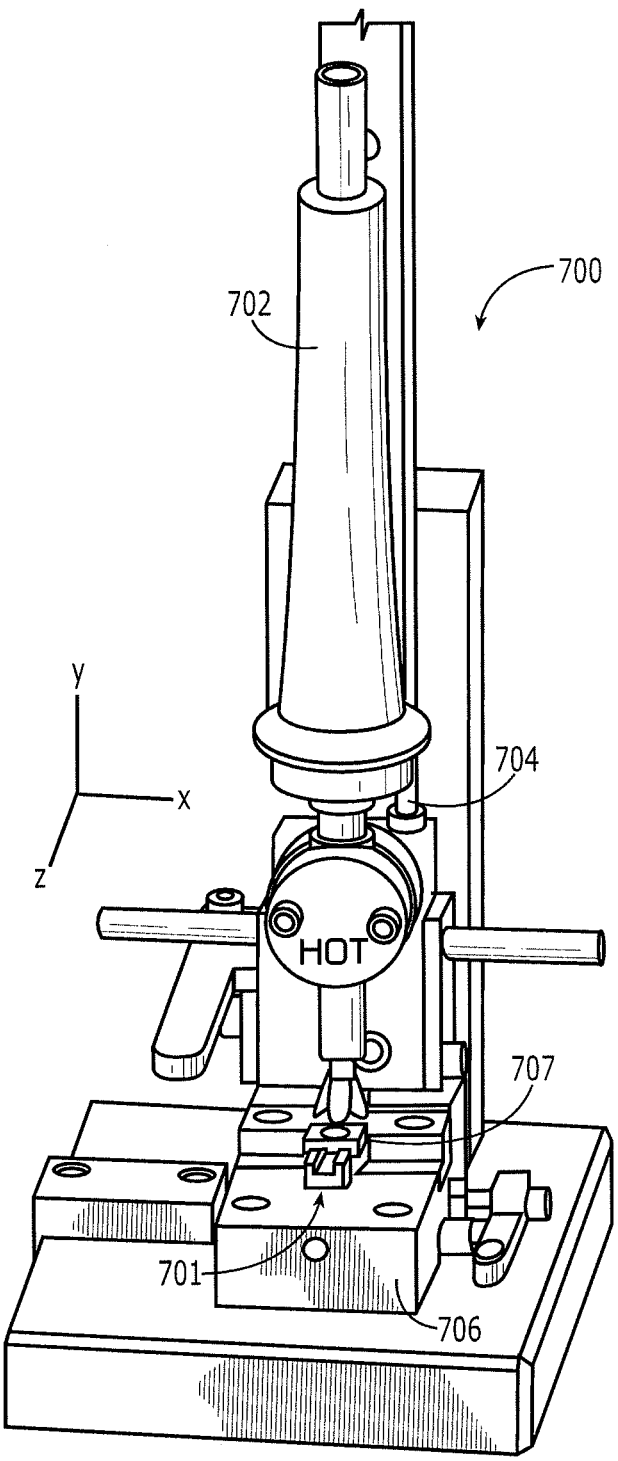
FIG. 7A is a perspective view of a manual assembly tool for manufacturing a ferrule with multiple fibers in a single benchtop unit in accordance with one embodiment of the invention.
Figure 7B:
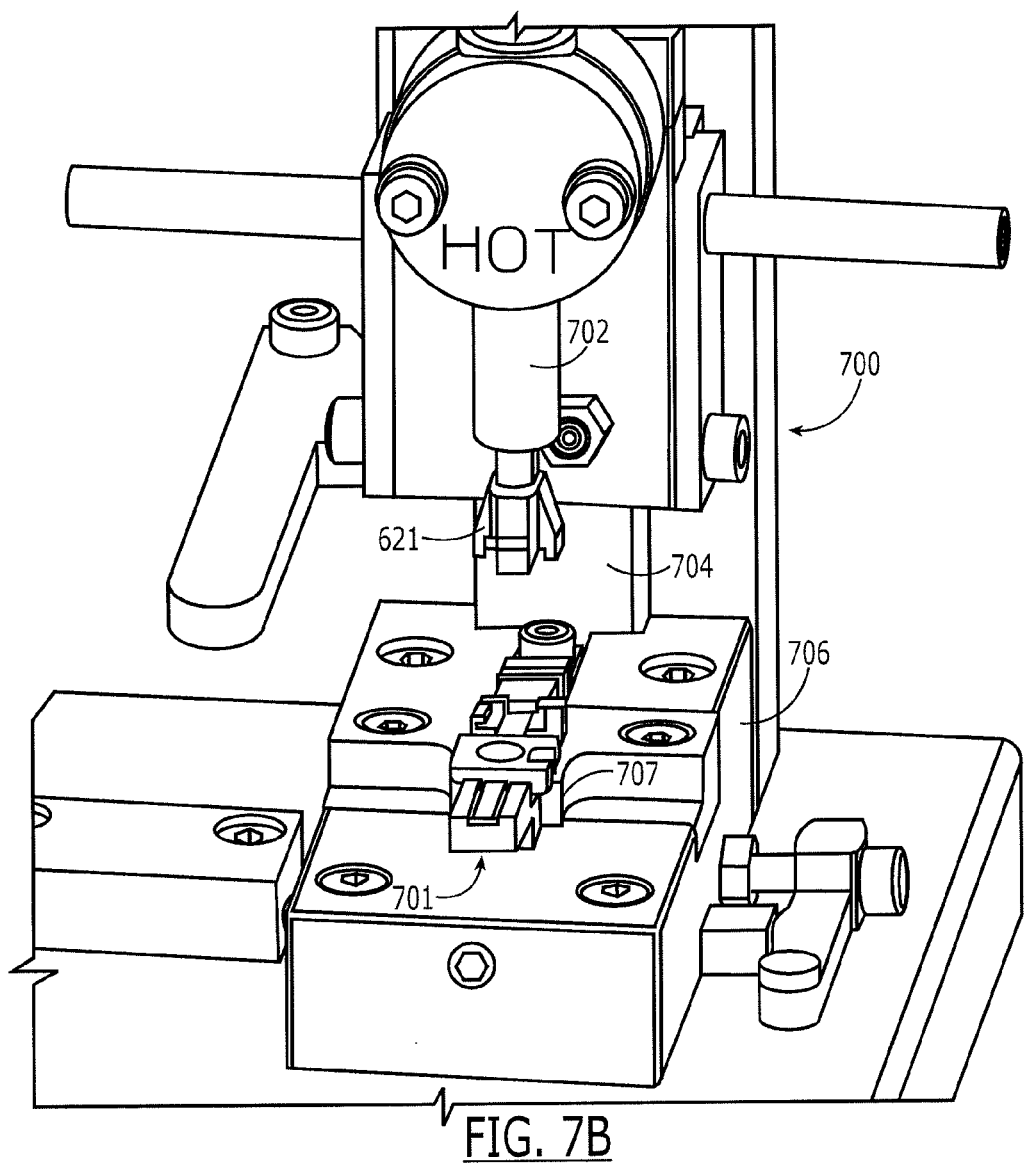
FIG. 7B is a close up view of a portion of the tool of FIG. 7A.

FIGS. 7A and 7B illustrate one exemplary embodiment of a hot pressure/curing die tool 700. This embodiment is adapted for an automated process and is not necessarily adapted to work with the tool station 600 of FIG. 6. FIG. 7A is a perspective view of the entire tool 700. FIG. 7B is a close up view of the operative portion of the tool 700. As shown, in this particular embodiment, the die tool 700 essentially comprises of a soldering iron 702 mounted on a vertically translatable (y-direction) gantry 704. An assembly 701 of a ferrule, jig, ferrule clamp, and waveguide clamp can be brought to the die tool 700 and placed within a mounting station 707 of an alignment block 706 that precisely locates the assembly 701 in the die tool 700 in all three dimensions.

Figure 8A:
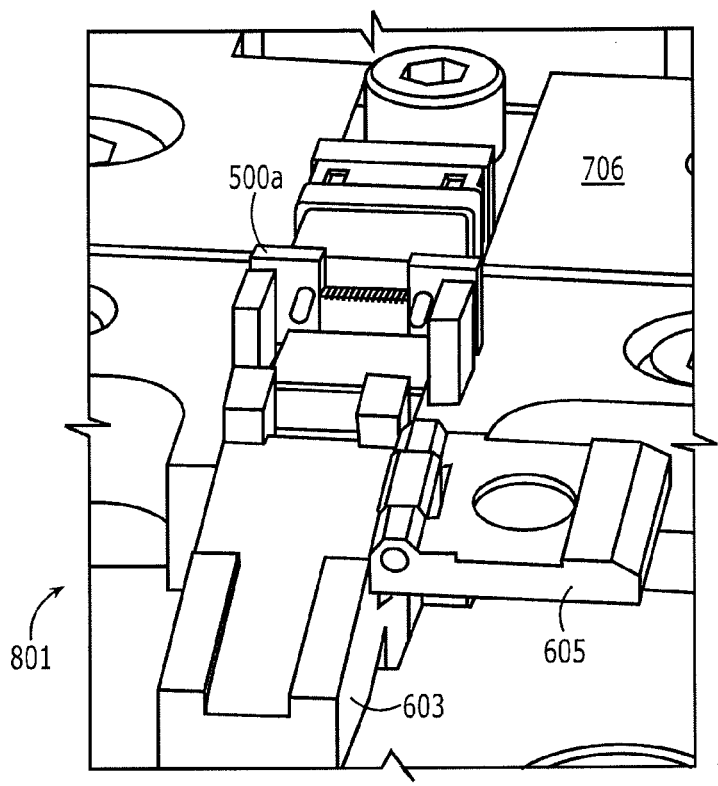
FIGS. 8A through 8D are perspective views of various stages of use of the tool of FIGS. 7A and 7B for assembling a ferrule in accordance with one embodiment of the invention.
Figure 8B:
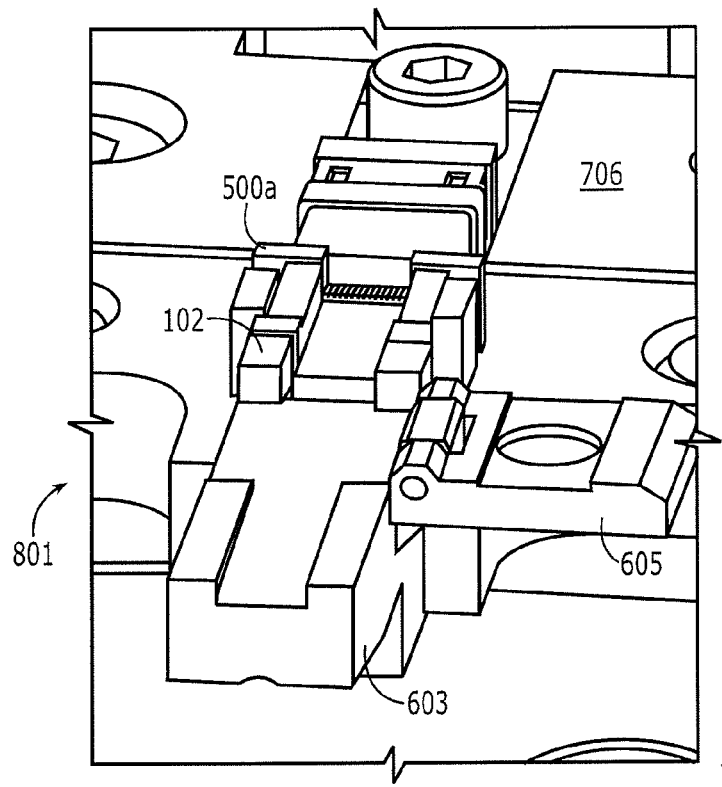

FIGS. 8A through 8D illustrate operation of the exemplary hot pressure/curing die tool in accordance with the principles of the invention. FIG. 8A is a close up view of the mounting station area 801 of the die tool 700 of FIGS. 7A and 7B with the first jig 500a clamped in place by jig clamp 603. Next, as shown in FIG. 8B, a ferrule 102 has been mounted on the jig 102 and the ferrule clamp 603 has been slid forward and locked to hold the ferrule 102 firmly against the jig 500a.

Figure 8C:
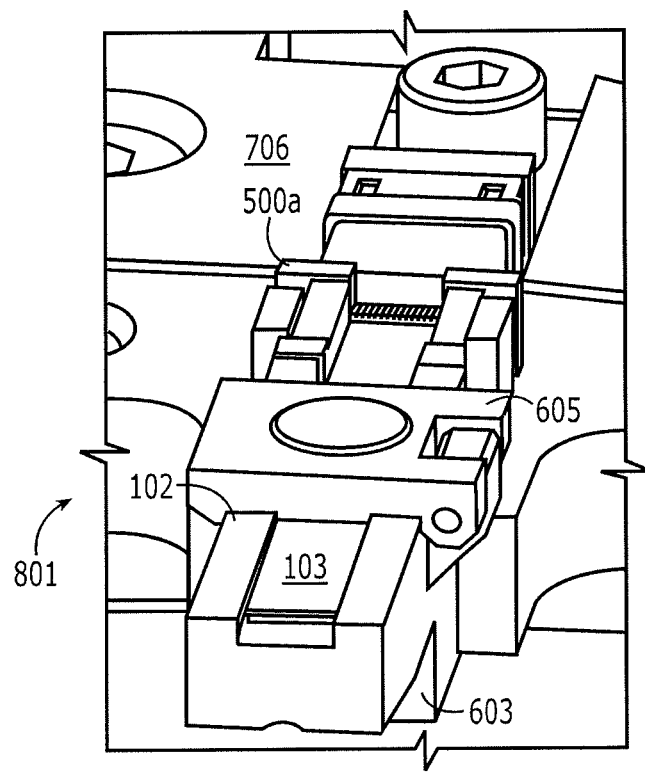
Figure 8D:
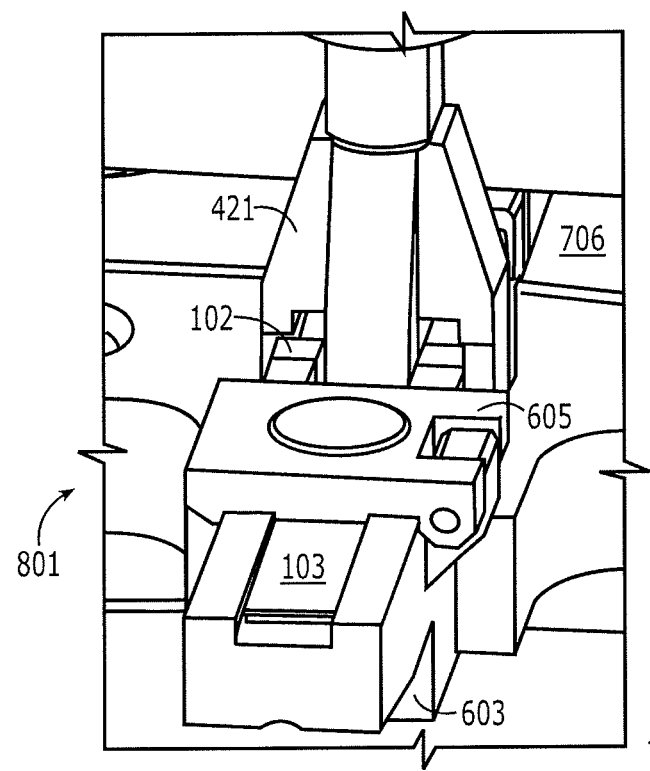

Next, as shown in FIG. 8C, the first adhesive layer (not seen) and waveguide layer 103 have been placed in the ferrule 102 and the waveguide clamp 605 has been rotated to the closed position. Finally, in FIG. 8D, the die 421 has deployed downwardly to press the waveguide layer 103 down. The die 421 is activated to heat it up to cure the adhesive.

The ferrule 102 can then be removed from the tool 700 and taken to a cutting station where the wave guides can be cut flush with the front face of the ferrule as previously described.

Although not shown with additional processing step drawings, next, the second jig 500b would be placed into the die tool 800 to replace the first jig 500a, the first die 421 would be replaced with the second die, and the process would be repeated for the next layer and so on until the last waveguide layer is completed.

If desired, a cover such as cover 112 shown in FIGS. 1A and 1B may be adhered in the remaining space of the cavity 114 of the ferrule to close off the cavity.

The method can be entirely automated, employing the use of standard pick and place tools and other common automation mechanisms to move the ferrules between the various stations, switch out the jigs and dies, introduce the optical transports into the ferrules, introduce adhesive into the ferrule cavities, etc.

The invention provides a simple system for aligning a large number of optical transports in a ferrule very efficiently and precisely. The process is time efficient because all of the optical transports in each layer transports are essentially aligned, cured in place, and cut simultaneously.

Further, the jigs can be produced inexpensively because they may be manufactured by two dimensional wire EDM, which can produce extremely accurately machined pieces (e.g., less than one micron tolerances) inexpensively.

While the specific embodiments discussed above related to waveguides, it should be apparent that the inventive methods and apparatus are equally useful in connection with optical fibers. Furthermore, although the term optical has been used throughout this specification, it is merely exemplary and is not intended to limit the wavelength of the electromagnetic radiation that may be transported in the transports discussed herein. Additionally, note that the use of relative directional terms herein, such as top and bottom or left and right, are for reference purposes only and are used in relation to each other based on an assumed orientation of the relevant object, but are not intended to imply that such object must be in such orientation.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A ferrule for containing and aligning a plurality of optical transports, the optical transports having a longitudinal dimension comprising:
 a ferrule body having a front face, a rear face, and at least one lateral side face extending between the front face and the rear face;
 a longitudinal cavity running from the front face to the rear face for receiving a plurality of optical transports, the longitudinal cavity having a lateral side opening through the at least one lateral face; and
 a multiplicity of rows of optical transports, each row comprising a multiplicity of optical transports.

2. The ferrule of claim 1 further comprising a cover positioned in the longitudinal cavity so as to close off the lateral side opening of the cavity.

3. The ferrule of claim 1 wherein the longitudinal cavity has a surface substantially opposite the lateral side opening, the surface having a plurality of longitudinal grooves, and wherein at least some of the optical transports are disposed in the longitudinal grooves.

4. The ferrule of claim 3, wherein the optical transports in a first one of the rows are disposed in the grooves.

5. The ferrule of claim 4 further comprising:
 a lateral alignment feature on the front face of the ferrule for mating with mating lateral alignment feature of another ferrule for purposes of laterally aligning the ferrule with the another ferrule, wherein the grooves are precisely laterally aligned relative to the alignment feature.

6. The ferrule of claim 3 wherein the grooves are V-shaped.

7. The ferrule of claim 1 further comprising adhesive affixing the optical transports to the ferrule body.

8. The ferrule of claim 7 wherein the optical transports comprise optical waveguides.

9. The ferrule of claim 1, further comprising:
one or more substrates, wherein one of said one or more supports is disposed between adjacent rows of optical transports.

10. The ferrule of claim 1, wherein each row has an equal number of optical transports.

11. The ferrule of claim 1, wherein said optical transports are fibers.

12. The ferrule of claim 1, wherein the longitudinal cavity has a surface substantially opposite the lateral side opening, the surface being essentially smooth and planar.

13. The ferrule of claim 12, wherein said longitudinal cavity is a right cuboid.

* * * * *